United States Patent
Chapman et al.

[19]

[11] Patent Number: 5,980,312
[45] Date of Patent: Nov. 9, 1999

[54] MODULAR OPTICAL/ELECTRONIC BACKPLANE ASSEMBLY

[75] Inventors: Robert Kenneth Chapman, West Winfield; Ritch Allen Selfridge, Sidney; Richard William Normann, Otego, all of N.Y.

[73] Assignee: Amphenol Corporation, Wallingford, Conn.

[21] Appl. No.: 09/006,193

[22] Filed: Jan. 12, 1998

[51] Int. Cl.$^6$ ................................................. H01R 13/60
[52] U.S. Cl. ...................... 439/540.1; 385/135; 361/788
[58] Field of Search ................................ 439/540.1, 65; 385/88, 135, 144; 361/788

[56] References Cited

U.S. PATENT DOCUMENTS

| | | | |
|---|---|---|---|
| 4,432,604 | 2/1984 | Schwab | 439/65 |
| 4,808,115 | 2/1989 | Norton et al. | |
| 5,037,313 | 8/1991 | Lindén et al. | |
| 5,204,929 | 4/1993 | Machall et al. | 385/135 |
| 5,234,348 | 8/1993 | Konsevich et al. | |
| 5,261,024 | 11/1993 | Allen et al. | |
| 5,363,465 | 11/1994 | Korkowski et al. | |
| 5,412,497 | 5/1995 | Kaetsu et al. | |
| 5,448,675 | 9/1995 | Leone et al. | 385/135 |
| 5,486,113 | 1/1996 | Lundh | |
| 5,513,293 | 4/1996 | Holland et al. | 385/135 |
| 5,611,013 | 3/1997 | Curzio | |
| 5,724,468 | 3/1998 | Leone et al. | 385/135 |
| 5,793,919 | 8/1998 | Payne et al. | 385/135 |

FOREIGN PATENT DOCUMENTS

| | | |
|---|---|---|
| 0 192 108 A2 | 8/1986 | European Pat. Off. |
| 0 579 872 A1 | 1/1994 | European Pat. Off. |
| 0 828 356 A2 | 3/1998 | European Pat. Off. |
| 0 830 035 A2 | 3/1998 | European Pat. Off. |
| 3221 303 A1 | 12/1984 | Germany |
| WO 95/23991 | 9/1995 | WIPO |

*Primary Examiner*—Gary F. Paumen
*Assistant Examiner*—Katrina Davis
*Attorney, Agent, or Firm*—Bacon & Thomas, PLLC

[57] ABSTRACT

A backplane assembly for a line replaceable module enclosure or rack includes an electrical backplane and a fiber optic backplane separately attachable to a single frame. The frame serves as a common datum for the electrical and fiber optic backplanes, and includes integral mating interface features for enabling line replaceable module connectors having a common shell to mate with the separate electrical and fiber optic connector structures on the backplane. The optical backplane is a one-piece structure to which pairs of individual fiber optic connectors, including input/output connectors, may be directly secured via a simple retention plate arrangement, the fiber optic connectors all having the same orientation to enable direct routing of fiber ribbons between rows of connectors serving different line replaceable modules.

15 Claims, 9 Drawing Sheets

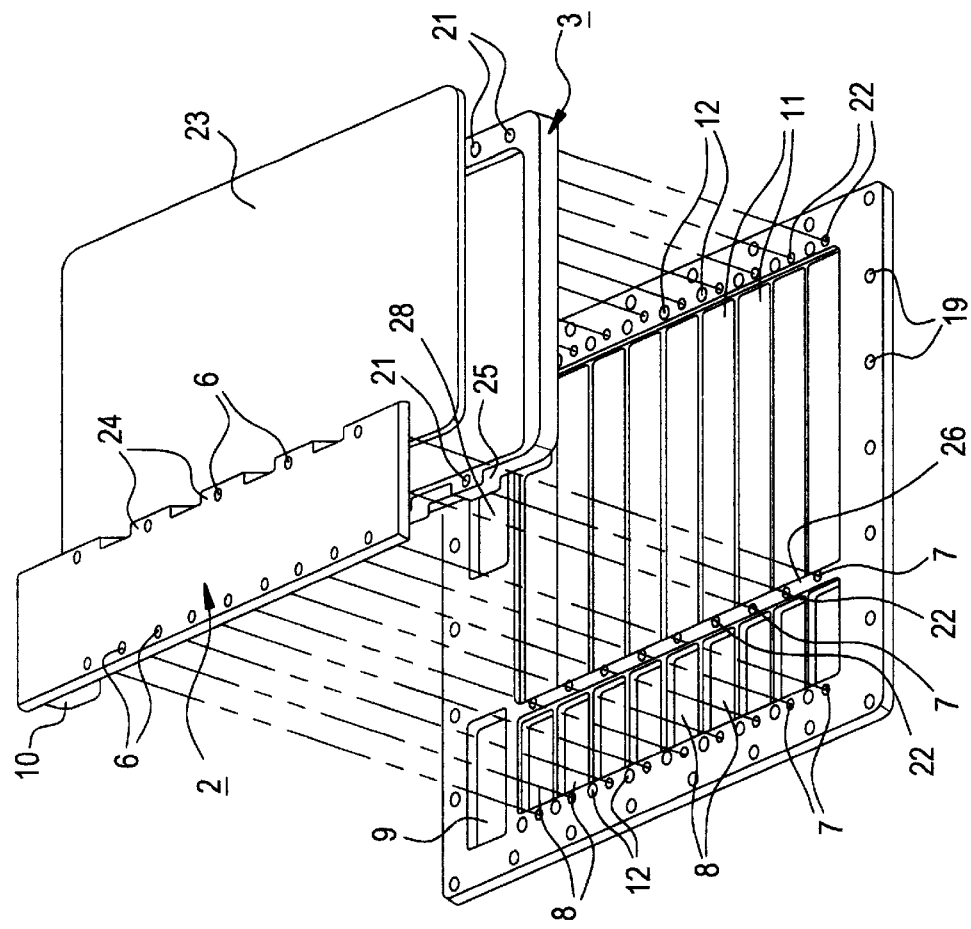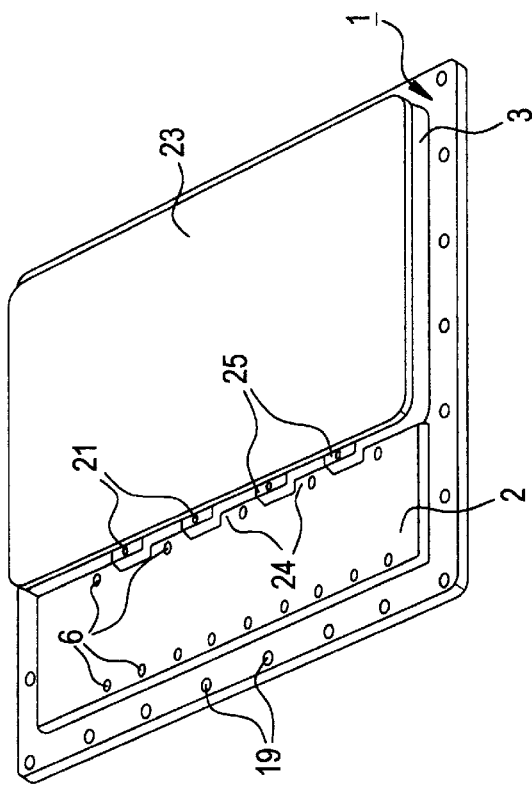

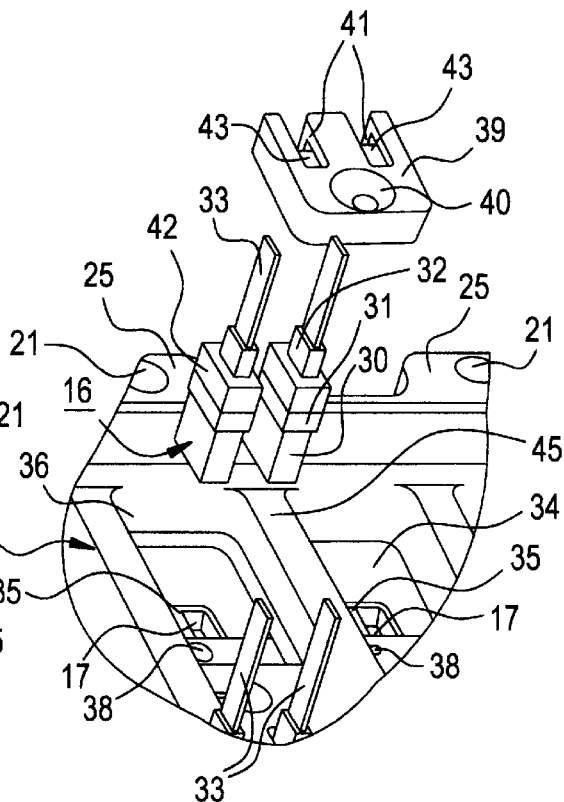
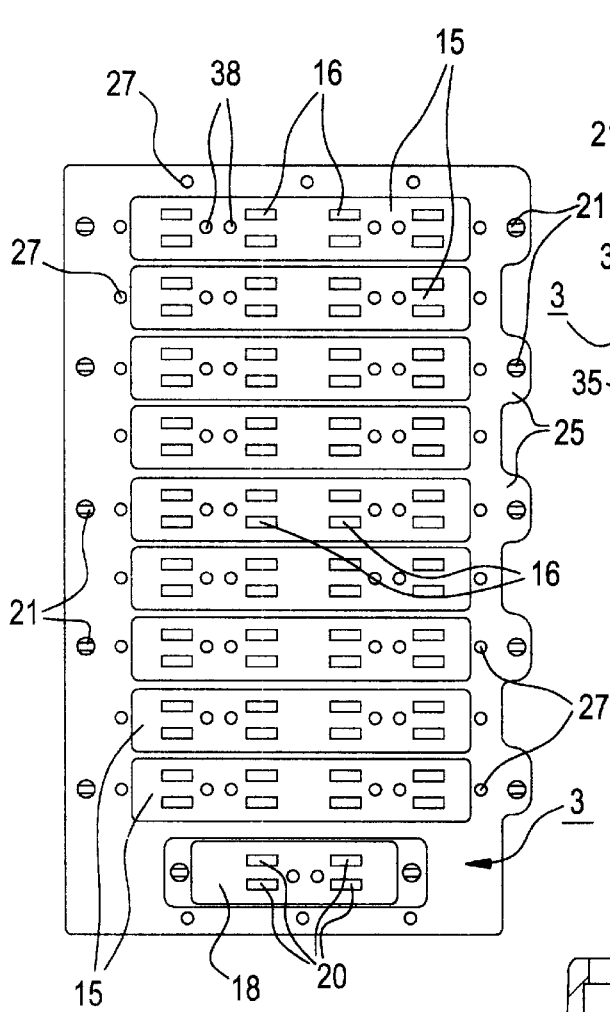
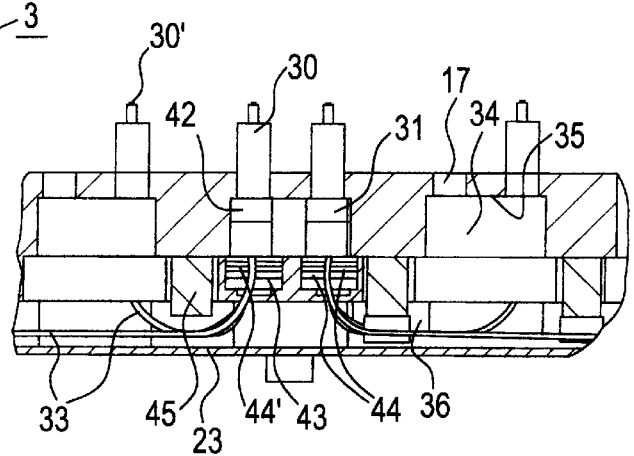

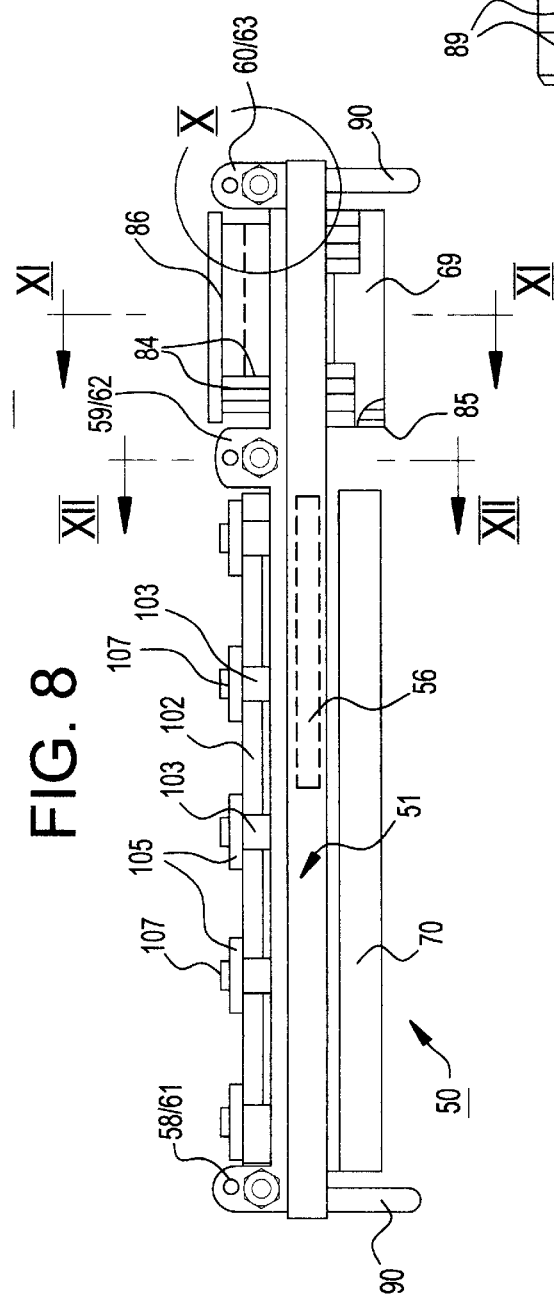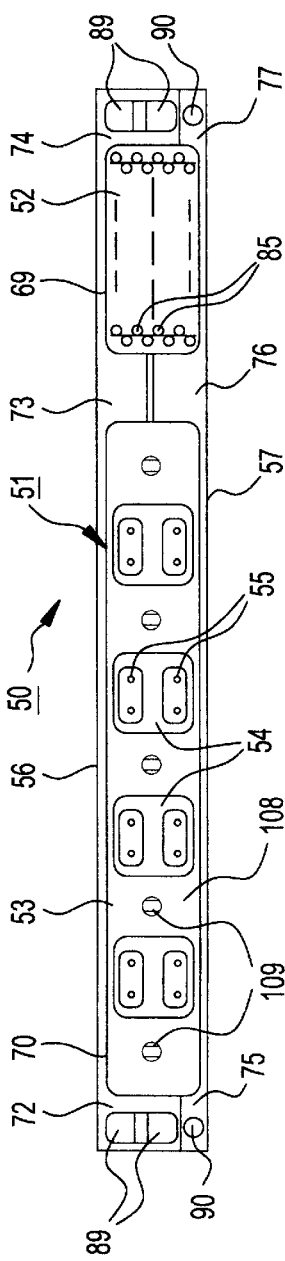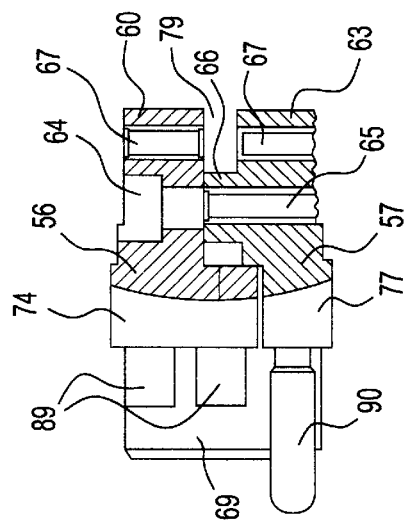

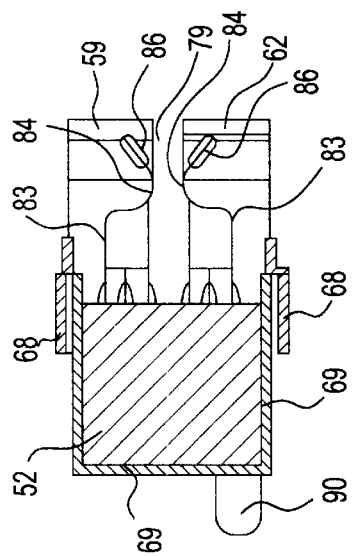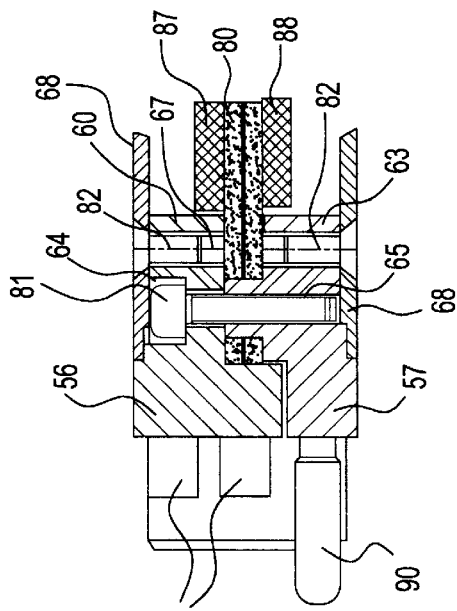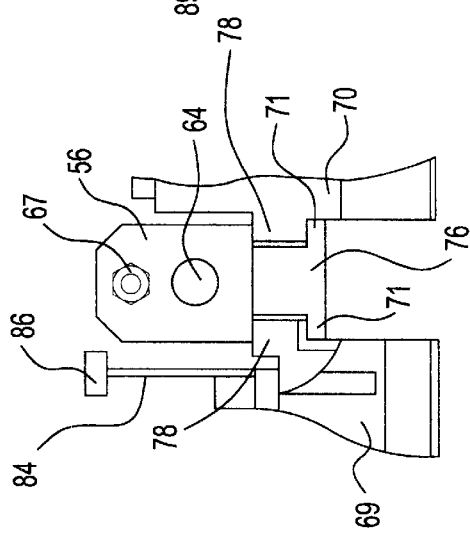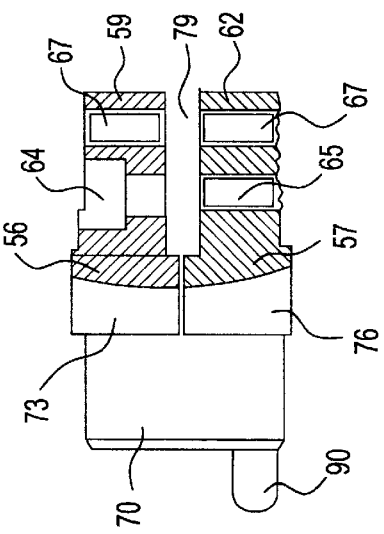

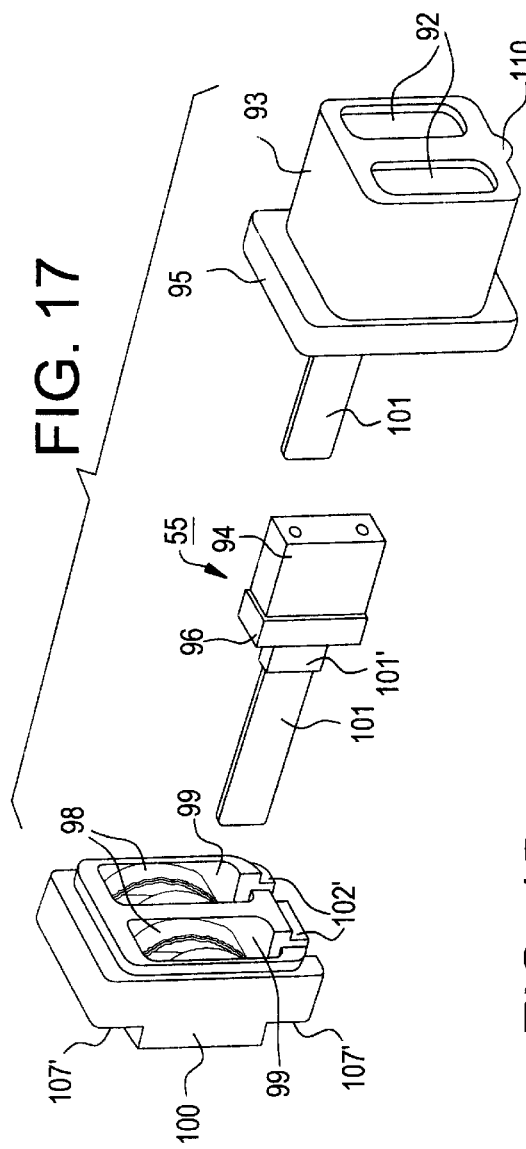
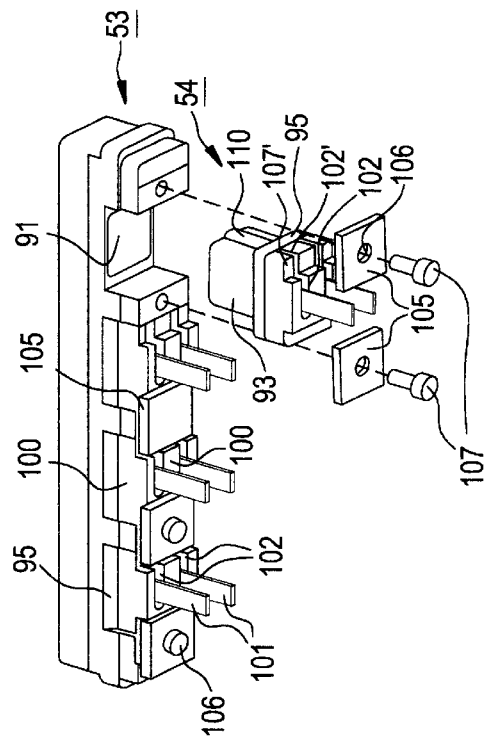
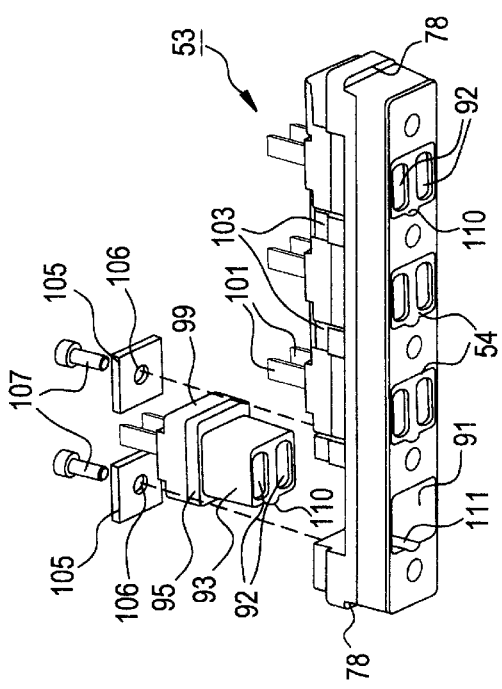
FIG. 17
FIG. 16
FIG. 15

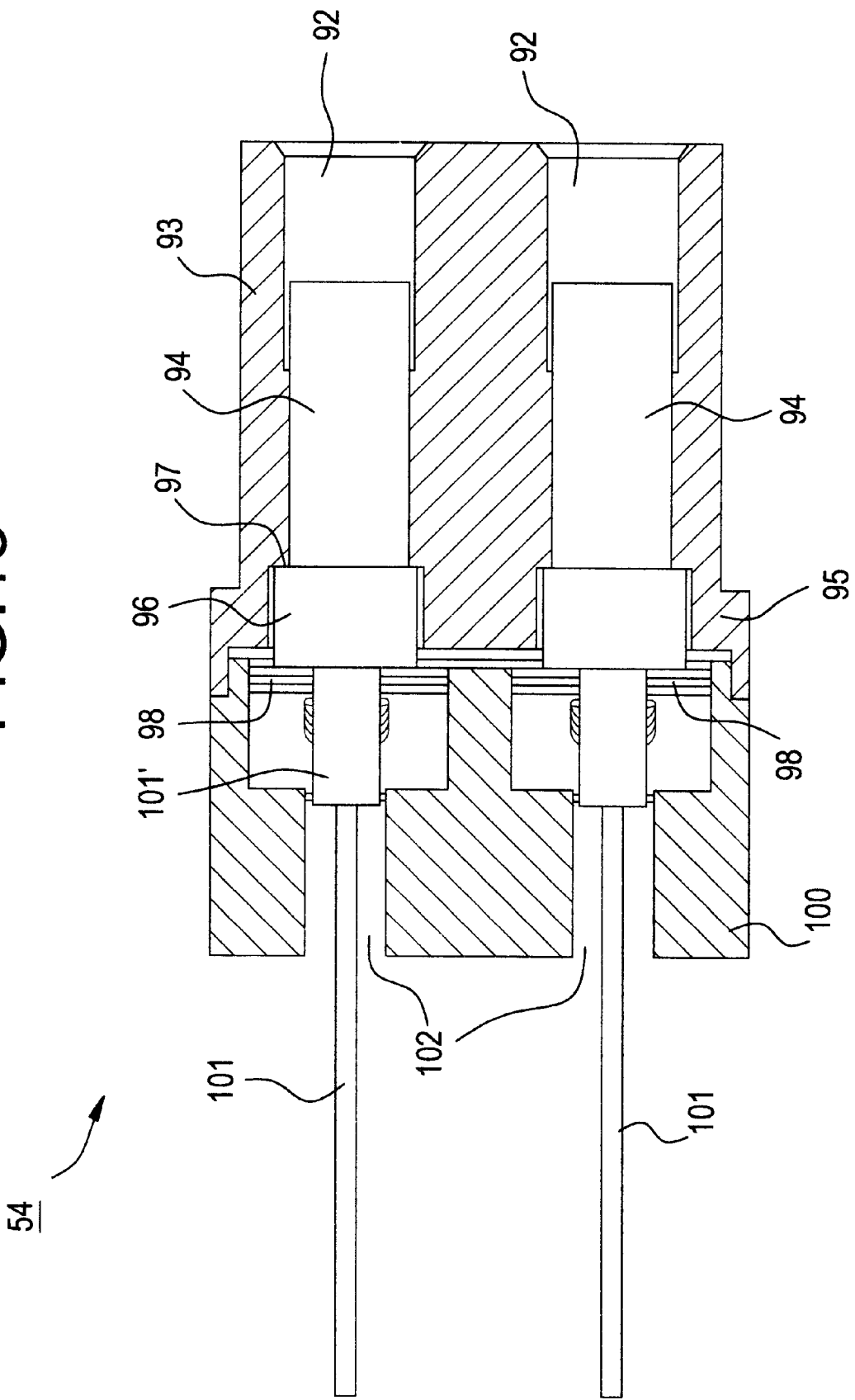

MODULAR OPTICAL/ELECTRONIC BACKPLANE ASSEMBLY

BACKGROUND OF THE INVENTION

1. Field of the Invention

This invention relates to a modular backpanel interconnect system capable of providing optical and electrical interconnections between components housed within an integrated rack, as well as input/output connections and rack-to-rack interconnections. The invention is particular suited for, though not limited to, military avionics applications such as the proposed "optical backplane interconnect system" (OBIS).

2. Discussion of Related Art

The type of backplane with which the present invention is concerned typically extends along the back surface of an enclosure or integrated rack of the type used in avionics systems. The rack supports electronic components which plug into the backplane from the front and provides interconnections between the components as well as input/output connections to control systems in the airplane and rack-to-rack interconnections, and is designed to facilitate removal and replacement of components with a minimum of downtime, thereby significantly improving flight readiness.

Each of the components performs a control, sensing, or recording function and is typically in the form of a circuit card utilizing very high speed integrated circuitry (VHSIC) technology contained within a sealed metal housing to form a package known as a line replaceable module (LRM). Descriptions of line replaceable modules and integrated racks therefor are found U.S. Pat. Nos. 4,808,115 and 5,234,348.

While systems employing purely electrical line replaceable modules have been employed in military avionics for many years, current development has concentrated on the integration of optical interfaces into the modules. Optical interfaces provide higher bandwidth connections than is possible with purely electrical interconnections, and may be used in connection with such functions as multi-sensor integration, data fusion, image processing, and Automatic Target Recognition.

The present invention is part of that effort, but concerns the backplane into which the modules are plugged rather than the modules themselves, or the connectors which are provided on the modules. It was developed in connection with a program known as the optical backpanel interconnect system (OBIS), whose objective is to provide a compact and easily serviceable backpanel assembly for use in connection with line replaceable modules having different data rates and protocols, with data rate and communication restrictions imposed by the optical backplane being limited only by the capability of the passive optical interconnections, the switching functions being provided by one of the line replaceable modules, known as the fabric module, so that the backplane can be used to interconnect a variety of different functional elements simply by appropriately designing the fabric module.

Although the present invention is designed to meet the OBIS specifications, it is not limited thereto, and features of the invention will have applicability to component rack systems used in fields other than military avionics, such as the next generation of commercial aircraft, including systems other than those employing line replaceable modules. However, unlike prior purely optical fiber optic connector modules or patch panels of the type commonly used in other industries, such as the telecommunications industry, the OBIS-type systems with which the present invention is concerned must meet rigid space and reliability requirements, and must share the space with electrical power lines, which are necessary to provide power, ground, and low speed control lines, as well as to permit backward compatibility. As a result, prior optical interconnect systems offer few solutions to the problems addressed by the present invention, and are cited here primarily as background. Examples of such prior purely optical interconnect systems, primarily for use in telecommunications type optical connector modules, are found in U.S. Pat. Nos. 5,513,293, 5,412,497, 5,363,465, and 5,204,929. Also of interest as background are prior optical interconnect systems which also include electrical connectors, including the above-cited U.S. Pat. No. 4,808,115 which describes a line replaceable module connector including optical and electronic connections, but not a modular backplane, U.S. Pat. Nos. 5,037,313 and 5,611,013, which also describe opto-electronic connectors but not in connection with either a line replaceable module or a rack system, and U.S. Pat. No. 5,486,113, which is representative of a number of references describing purely electrical backplanes designed to provide purely electrical connections between components having different requirements. None of the connectors or interconnection systems described in these patents is suitable for use in the OBIS system, or in general to provide a modular interconnect system having the combination of compactness, reliability, and ease-of-maintenance of the present invention.

Instead, despite the sophistication and rapid development of components requiring optical interconnects, the experience of the telecommunications industry, and even the previous incorporation of optical connectors in LRM interconnect systems represented by the system described in U.S. Pat. No. 4,808,115, initial attempts at meeting specifications for optical interconnect systems have approached the problem as one of simply retrofitting optical connectors onto conventional electrical backplanes. For example, one proposed design involves mounting of individual optical connectors in a common frame to form a modular optical backplane, the optical backplane in turn being mounted behind an essentially conventional electrical backplane so that it can be separately removed for repair and maintenance.

While this arrangement facilitates the inclusion of optical connectors in the backplane, it has a number of disadvantages. For example, in order to service the electrical backplane, the optical backplane must be removed even if the optical backplane does not need servicing. In addition, this design does not provide an input/output connector for simplifying external fiber optic connections to the backplane, as opposed to interconnections between modules, forcing each separate connector on the module to be disconnected in order to remove the module, and because the previously proposed optical backplane design is simply piggybacked onto a standard electrical backpanel arrangement, the fiber optic interconnects must be routed around the central electrical connections using a T formation of the fiber ribbons in order to optimize in plane versus out of plane bends.

The present invention, in contrast, abandons any attempt to fit the optical backplane onto the standard electrical backplane, taking the unique approach of designing the electrical and optical elements of the backplane as separate modules, while still integrating the modules to form a common backplane which possesses the necessary dimensions, permits use of the backplane in an otherwise standard LRM rack, meets reliability standards critical for military and other avionics applications, and yet is more efficient to manufacture than previously proposed designs.

SUMMARY OF THE INVENTION

It is accordingly an objective the invention to provide a modular backplane assembly having both electrical and fiber optic connector modules for providing electrical and optical connections between electronic components, and in which the electrical and fiber optic connector modules are independently separable from the backplane assembly for service or replacement.

It is also an objective of the invention to provide a modular backplane assembly which provides connectorized input/output as well as module-to-module interconnections, simplifying both the replacement of components within the rack and external connections to the backplane.

It is another objective of the invention to provide a modular backplane assembly having an optical connector module in which all slots possess the same orientation, eliminating the need for T formation routing of the fiber optic interconnection ribbon cables.

It is yet another objective of the invention to provide a modular backplane assembly having an optical connector module which permits direct routing of all fiber interconnects.

It is a further objective of the invention to provide a modular backplane assembly having an increased connector density.

It is a still further objective of the invention to provide a modular backplane assembly having a common shell or frame for the electrical and optical connector modules that provides a common datum for each module and the rack, and which reduces tolerance stack-up.

It is also an objective of the invention to provide an arrangement for applying a bias to fiber optic connectors which occupies a relatively small volume and yet provides a high spring force without plastic deformation of the springs.

These objectives are achieved, in accordance with the principles of a preferred embodiment of the invention, by providing a backplane assembly made up of an electrical backplane and fiber optic backplane separately attachable to a single frame, the single frame serving as a common datum for the electrical and fiber optic backplanes. Preferably, the single frame includes integral mating interface features for enabling line replaceable module connectors having a common shell to mate with the separate electrical and fiber optic connector structures on the backplane.

Also in accordance with the principles of the preferred embodiment of the invention, the optical backplane is a one-piece structure to which pairs of individual fiber optic connectors, including input/output connectors, are directly secured via a simple retention plate arrangement, the fiber optic connectors all having the same orientation to enable direct routing of fiber ribbons between rows of connectors serving different line replaceable modules.

The electrical backplane of the preferred embodiment is essentially standard, but provides a reduced number of electrical connections in recognition of the decreased need for such connections afforded by the use of high speed optical interconnects, thereby making available sufficient space to arrange the optical backplane in a rectangular configuration which permits the optical connectors to all have the same orientation, and which permits direct routing between the optical connectors and connectors on a fabric module.

Because the optical connectors all have the same orientation and arranged in horizontal rows, they can be used with line replaceable module connectors containing both electrical and fiber optic components fitted within a standard SEM-E shell, in a manner similar to that disclosed in U.S. Pat. No. 4,808,115, but with increased number of fiber optic connections per shell. An especially advantageous version of the standard SEM-E shell is disclosed for use in connection with the backplane of the present invention, although the shell itself is not part of the present invention.

In addition, an especially advantageous arrangement for biasing the individual fiber optic connectors towards each other is disclosed, in which both the backplane and the corresponding connectors include provision for accommodating stacked leaf spring arrangements which permit a high biasing force to be generated in a relative small space without plastic deformation of the springs.

BRIEF DESCRIPTION OF THE DRAWINGS

FIG. 3 is a perspective view of the rear of the modular backplane assembly of the preferred embodiment.

FIG. 4 is an exploded perspective view of the rear of the modular backplane assembly of FIG. 3.

FIG. 5 is a cross-sectional side view of the optical backplane subassembly shown in FIGS. 1–4.

FIG. 6A is a perspective view of the optical backplane sub-assembly of the preferred embodiment of the invention.

FIG. 7A is a plan view of an alternative fiber optic backplane configuration according to the principles of a preferred embodiment of the invention.

FIG. 8 is a plan view of a connector for use in connection with the backplane of the preferred embodiment.

FIG. 9 is a front view of the connector of FIG. 8.

FIG. 10 is a partially cross-sectional side view taken at location IX in FIG. 8.

FIG. 11 is a cross-sectional side view taken along line X—X in FIG. 8.

FIG. 12 is a cross-sectional side view taken along line XI—XI in FIG. 8.

FIG. 13 is a bottom plan view of the portion of the connector shown in cross-section in FIG. 12.

FIG. 14 is a cross-sectional side view similar to that of FIG. 10, but including a heatsink and circuit boards.

FIG. 15 is a perspective view showing the front of an optical insert for the connector of FIGS. 8–12.

FIG. 16 is a perspective view showing the rear of an optical insert for the connector of FIGS. 8–12.

FIG. 17 is a perspective view of an optical connector module for the insert of FIGS. 13 and 14.

FIG. 18 is a cross-sectional side view of the optical connector module illustrated in FIG. 17.

DETAILED DESCRIPTION OF THE PREFERRED EMBODIMENTS

Figure 2:
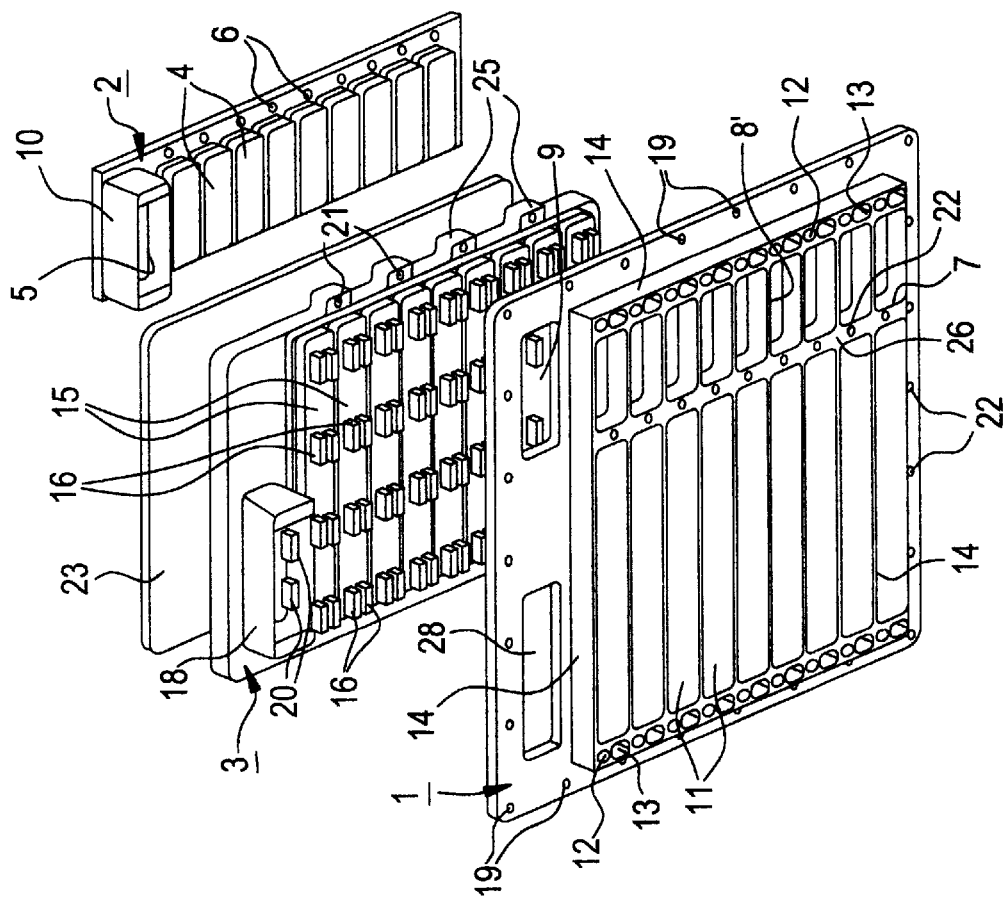
FIG. 2 is an exploded perspective view of the front of the modular backplane assembly of FIG. 1.
Figure 1:
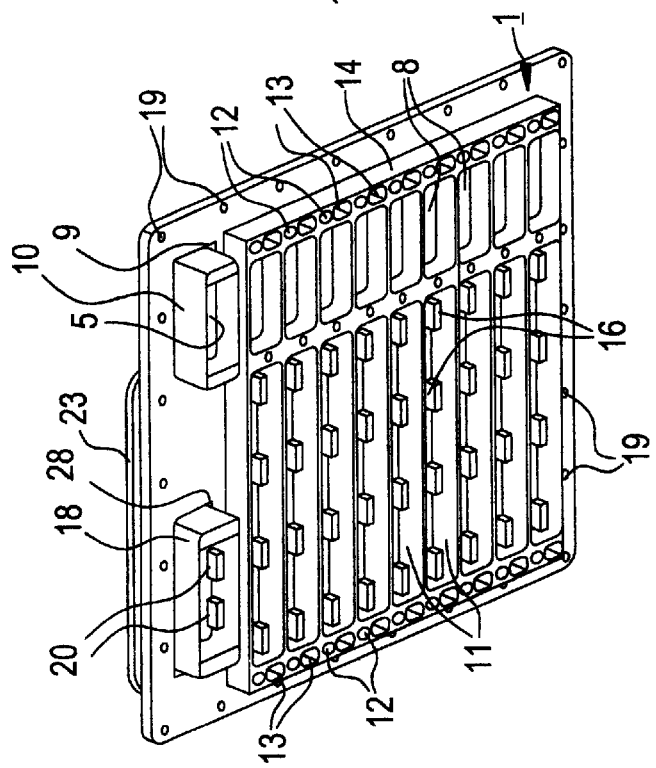
FIG. 1 is a perspective view of the front of a modular backplane assembly constructed in accordance with the principles of a preferred embodiment of the invention.

As illustrated in FIGS. 1–4, the backplane assembly of the preferred embodiment of the invention includes a frame 1, an electrical backplane 2, and a fiber optic backplane 3. The frame 1 serves as a common datum for the electrical and fiber optic backplanes, but each of the backplanes is separately attachable and removable from the frame for service or replacement.

Frame 1 and backplanes 2 and 3 are one-piece structures and, although not limited to a particular material, are preferably made of a conductive metal such as nickel-plated aluminum alloy to provide grounding capabilities as well as structural support for the electrical and optical connectors, with the materials of the backplanes preferably being matched to each other and to the rack in which the backplanes are accommodated to compensate for thermal expansion.

Electrical backplane 2 is essentially a flat plate having a plurality of openings (not shown) for receiving multiple contact electrical connector inserts 4, and an opening 5 for receiving an input/output connector insert (not shown). In addition, electrical backplane 2 includes a plurality of holes 6 corresponding to threaded holes 7 in the frame 1, and through which screws or other suitable fastening means may be inserted to secure the electrical backplane to the frame (holes 7 are shown only in FIGS. 3 and 4).

To permit access to the electrical connector inserts 4 from the front of the backplane assembly, frame 1 includes openings 8 and 9 shaped to receive the front of inserts 4 and a shielding structure 10 extending forwardly of the input/output connector opening 5 on electrical backplane 2. Also included in frame 1 are a plurality of openings 11 for receiving forwardly extending portions 15 of the optical backplane 3, described below, fiber optic input/output connector opening 28, and holes 19 for attaching the frame to a rack or line replaceable module enclosure.

The portion of frame 1 surrounding openings 8, 9, and 11 is in the form of a mating interface structure 14 projecting from the frame to provide shielding for the connector inserts and which, as illustrated, includes threaded openings 12 and key-receiving openings 13 corresponding to openings in the SEM-E backplane connectors illustrated in FIGS. 8–14, which serve as connectors for the line replaceable modules with which the illustrated backplane assembly is designed to be used openings 12 and 13 are arranged to receive the standard fastening screw and keying features provided on the corresponding line replaceable module connectors.

It is of course possible to vary the shapes of the insert-receiving openings in the electrical backplane 2 and frame 1 to accommodate different types of connector inserts, and different mating interface configurations, as well as to fasten the electrical backplane to the frame by means other than screws or other discrete fasteners, the invention not being limited to SEM-E connectors or to any particular fastening arrangement. In addition, the area occupied by the electrical connector backplane relative to the frame may be varied depending on the ratio of optical to electrical interconnections desired, although the illustrated embodiment is notable in that it devotes only approximately 33% of the space for electrical pins, with the rest of the space being for optical connectors. This is a significant difference from prior designs, and results from the fact that high speed data communication is now primarily optical, with the electrical portion only requiring power, ground, and a few low speed control lines, with the structure and arrangement of the contacts in the inserts, and of the inserts themselves, being otherwise standard.

On the other hand, the placement of the threaded openings 12 on a forwardly extending portion of the frame rather than on a forwardly extending portion of the backplane, although not absolutely necessary, is particularly advantageous because it allows the electrical backplane to be detached without first detaching the line replaceable modules from the frame, and the inclusion of shield and other mating interface structures on the frame rather than the backplane being advantageous in order present a continuous mating interface to both the electrical and optical sides of the mating connectors, without alignment problems such as might occur if the critical mating structures were divided between the separate backplanes.

While the electrical backplane 2 accommodates high density connector inserts which are essentially standard except for the reduced size of the inserts resulting from the recognition that a smaller number of electrical connections are required in the OBIS design, the fiber optic backplane is unique in that it does not use discrete fiber optic connector supporting structures or modules, the fiber optic connectors 16 instead being secured directly to the fiber optic backplane itself. To this end, the fiber optic backplane 3, which is shown in greater detail in FIGS. 5, 6A, and 6B includes a plurality of integral raised portions 15 having individual openings 17 for receiving the plurality of fiber optic connectors 16, as will be explained in more detail below, the raised portions 15 being received, as indicated above, in openings 11 of the frame 1. In addition, the illustrated fiber optic backplane 3 includes a raised portion 18 surrounding openings (not shown) for at least two input/output fiber optic connectors 20.

The fiber optic backplane 3 is attached to the frame 1 in a manner similar to the manner in which the electrical backplane is attached. For example, holes 21 in the fiber optic backplane may be aligned with holes 22 in frame 1 (holes 22 are shown only in FIGS. 3 and 4) to receive screws or other attachment means by which the fiber optic backplane is secured to the frame from the rear when raised portions 15 of the fiber optic backplane are fitted into openings 11 in the frame, or other attachment means may be provided as desired. In addition, the fiber optic backplane 3 may be fitted with a cover 23 once the connectors 15 and 20 have been secured thereto.

Because the electrical and fiber optic connectors are positioned side-by-side, as is best seen in FIGS. 3 and 4, either of the backplanes can be removed for repair or replacement without affecting the other. In order to minimize the space occupied by the two backplanes, the adjoining edges may include complementary extensions 24 and 25 containing the respective attachment holes 6 and 21, so that the portion 26 of frame 1 situated between openings 8 and 11 and containing threaded holes 7 and 22 may be minimized. In addition, threaded holes 7 and 22 may simply be replaced by slots, each of which is capable of accommodating a pair of screws or bolts, which would allow for some tolerance in the fit between the extensions. This is desirable because, in the illustrated embodiment, the fiber optic connectors and electrical contacts of the mating line replaceable modules are contained in common shells, as illustrated in FIGS. 8–14, and therefore precise vertical alignment between the optical and electrical backplanes is therefore necessary.

In addition to the possible variations noted above, those skilled in the art will appreciate that the number and relative locations of the input/output connectors openings may be varied as required, as may the locations of the screw holes for fastening the respective backplanes to the frame. Furthermore, the input/output connectors may be omitted from the backplane assembly entirely in favor of direct cable connections to selected fiber optic connectors and/or electrical connector inserts as necessary.

Figure 6B:
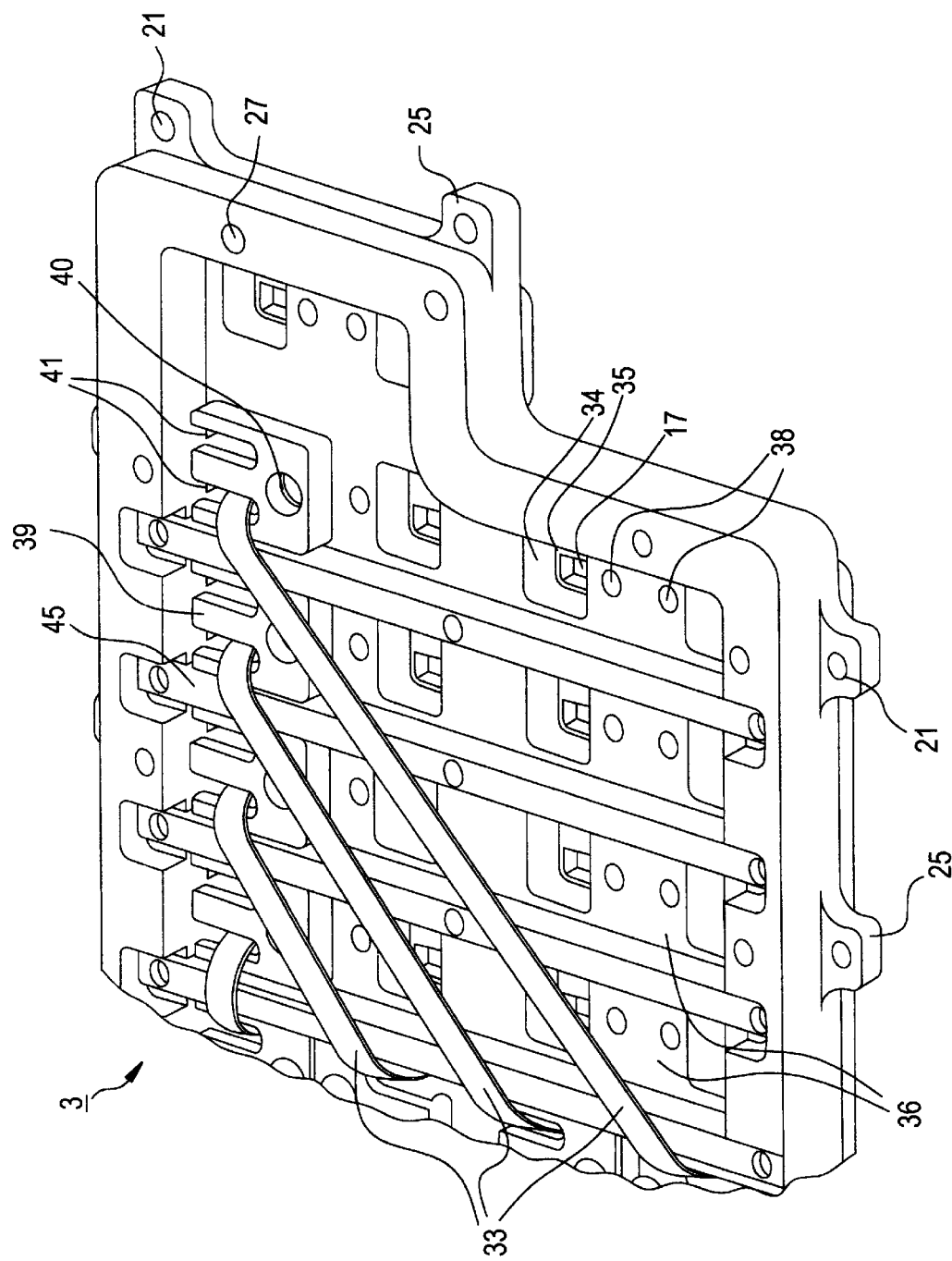
FIG. 6B is a further perspective view of the optical backplane sub-assembly of the preferred embodiment of the invention.
Figure 7C:
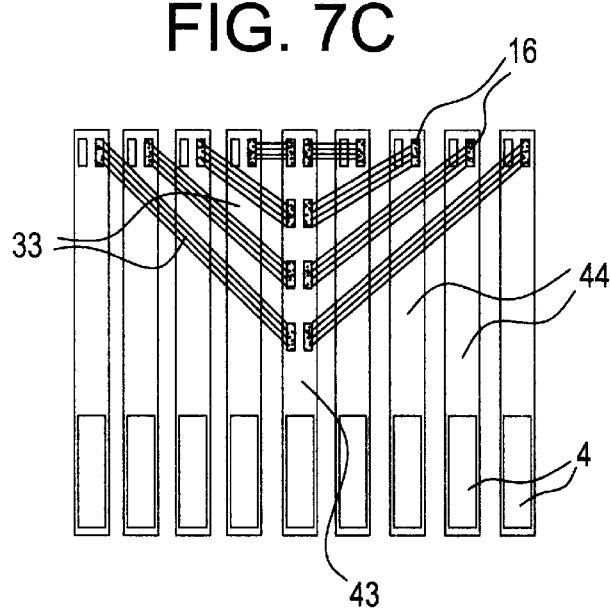
FIG. 7C is a schematic of a direct ribbon cable routing configuration which can be used with the optical backplane of the preferred embodiment.
Figure 7B:
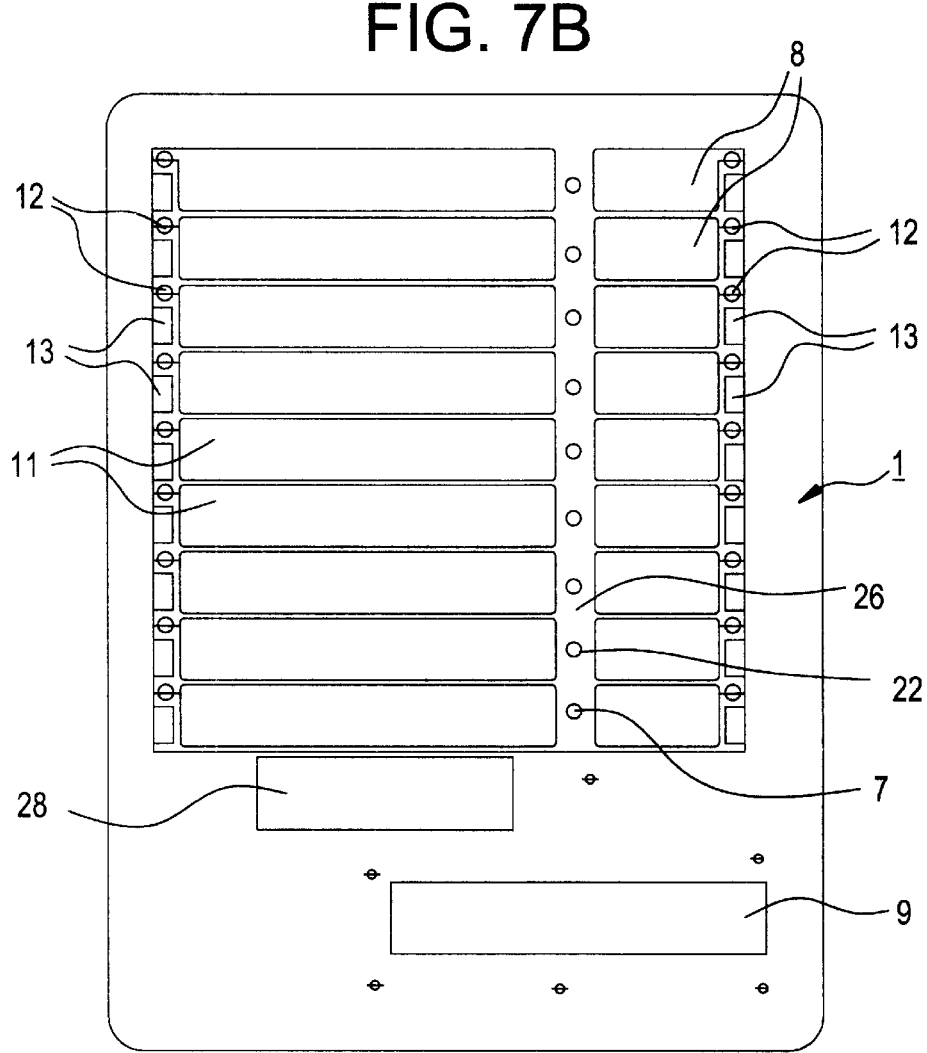
FIG. 7B is a plan view of an alternative common frame for the fiber optic backplane illustrated in FIG. 7A.

One such alternative configuration is shown in FIGS. 7A and 7B, in which the location of the fiber optic input/output connectors 20 for the fiber optic backplane 3 is moved from the top left side of the backplane to the bottom center position, and the opening 9 for the electrical input/output connector structure is expanded and place below the fiber optic input output connectors. Although not shown, in this variation the electrical backplane can either assume an L-shape, or the electrical input/output connector can be a separate structure. Since the backplanes and frame of this variation are otherwise essentially identical to the backplanes and frame of FIGS. 1–5, 6A, and 6B, except for the positions and size of the input/output connector openings, and except that holes 27 on the fiber optic backplane 3 for receiving cover mounting screws are illustrated, elements of this variation have been given the same reference numerals as corresponding elements of the first illustrated embodiment.

In the illustrated embodiment, fiber optic connectors 16 are in the form of twelve fiber connectors of the type known as MT connectors, which include a mating portion 30, alignment pins 30', pin block 31, and strain relief 32, from which extends cable 33. These connectors are standard and form no part of the present invention, and it is in any case within the scope of the invention to use fiber optic connectors other than the illustrated MT connectors, and to vary the shapes of the connector receiving openings 17 accordingly.

As illustrated in FIGS. 5, 6A, and 6B, openings 17 advantageously communicate with a common opening 34 for a pair of connectors, with the front surface 35 of the common opening providing a datum for the front surfaces of the connector pin blocks, and the common opening 34 being further in communication with a common groove 36 for a row of connector pairs, the front surface 37 of the common groove including threaded openings 38 for screws (not shown) used to attach retaining plates 39. Retaining plates 39 include screw holes 40 and slots 41 for providing passage of cables 33, and are used to retain the fiber optic connectors in the openings 34. Biasing of the connectors in a forward direction is provided by a spring arrangement which presses against the rear of the connectors, illustrated as being provided with pin clamps 42, with the grooves 36 being separated from each other by structures 45 which form cable support rails, illustrated in FIG. 6B.

In particular, in the illustrated embodiment, the plates 39 include cavities 43 in which are placed springs 44 so as to engage the rear of the pin clamps 42 and press the connectors in the forward direction, and the springs 44 are in the form of simple curved beam springs which are stacked and fitted in a stressed condition within cavities 43, four to a cavity. Stacking of the simple curved beam springs permits a greater force to be generated over a small range of displacement than is possible with a single spring, which has been found to create a large spring force in a very small volume without plastic deformation. A spring of the equivalent thickness would plastically deform at a much lower deflection than the stack of four.

This simple retention arrangement minimizes the number of parts required, ensures accurate alignment of the connectors, provides excellent shielding, and yet increases connector density because the need for discrete connector housing modules is eliminated. Furthermore, it can be used either to removably retain the fiber optic connectors within the fiber optic backplane for the life of the connectors, or to removably retain the connectors on a temporary basis during testing, with permanent retention being obtained by filling grooves 36 with a potting material once assembly and testing has been completed.

The ribbon cables 33 extending from the rear of the connectors can either be connected directly to components external to the rack, to the fiber optic input/output connector for facilitating interconnection between racks and other components, or to other modules. It is of course anticipated that many of the connectors will not be used since the basis of the OBIS design is to provide sufficient connectors for a variety of different rack and component arrangements. As indicated above, however, one of the advantages of the preferred embodiment of the invention, and in particular the manner in which the fiber optic connectors are arranged, is that direct routing of interconnect cables between the connectors is possible, as illustrated by way of example in FIG. 7C, in which the center row of connector pairs 43 is arranged to serve as the fabric module connection for providing switching functions between the other modules 44 and is connected to the other modules by direct routing of the twelve channel multimode ribbon cables 33 to the appropriate connectors 16. It will be appreciated by those skilled in the art that the preferred backplane assembly also lends itself to numerous other cable routing configurations, and that even the arrangement of fiber optic connectors in rows of pairs may be varied within the scope of the invention. Because the MT connectors are all oriented in the same direction, there is no need to bend the fibers, providing a continuous low loss optical pathway between each of the modules.

While the electrical and fiber optic backplane modules of the preferred embodiment may be designed, within the scope of the invention, for use with a variety of different line replaceable module connectors, and for use with mating connectors other than those used in line replaceable modules, including mating connector arrangements in which the electrical and fiber optic connectors are separate structures, an especially advantage line replaceable module connector is one in which the optical and electrical connector components are integrated into a single shell, illustrated in FIGS. 8–14 as an SEM-E shell. The overall size and shape of the shell, the configuration of the electrical connector side of the shell, and the attachment and keying features are all standardized or conventional, with the two differences between the illustrated SEM-E shell and known SEM-E shell configurations being the arrangement of the fiber optic connectors in the shell, and the relatively small area occupied by the electrical connector side of the shell, which area corresponds to the area of the electrical portion of the backplane assembly of the preferred embodiment.

The illustrated line replaceable module connector 50 is arranged to mate with one of the electrical connector inserts 4 in the electrical backplane 2, and with a row of fiber optic connector pairs in the fiber optic backplane 3, and includes a common shell 51 having an opening for receiving an electrical connector insert 52 and an opening for receiving a single fiber optic connector insert 53, the optical connector insert 53 in turn having a plurality of openings for receiving optical connector modules 54, each of which supports two fiber optic connectors 55 corresponding to the fiber optic connectors 16 of the preferred backplane assembly.

The common shell 51 for the electrical and fiber optic connector inserts actually consists upper and lower halves 56 and 57 which are secured at the rear via rearwardly extending tower assemblies 58–60 on the upper half 56, and rearwardly extending tower assemblies 61–63 on the lower half, as is best shown in FIGS. 10, 12, and 14. Each of upper tower assemblies 58–60 includes a through hole 64 corresponding to a threaded hole in lower tower assemblies 61–62, with a space 79 being formed between the upper and lower tower assemblies for receiving a forward portion of a heat sink 80 on the line replaceable module circuit card, the upper and lower tower assemblies and heat sink being secured together by screws 81 extending through holes 64, the heat sink, and threaded holes 65. Lower tower assemblies 61 and 63 at the ends of the line replaceable module connector shell 50 may include bosses 66 arranged to fit through alignment openings in the heat sink. As is conventional, additional screw holes 67 for receiving screws 82 are provided in both the upper and lower tower assemblies 58–60 and 61–63 to attach cover plates 68 for the upper and lower sides of the module.

The contact assemblies of the electrical connector insert are conventional. As shown in FIG. 11, the contact pins 83 include radiused, surface mount tails 84 extending rearwardly from the mating portions 85 (shown in FIGS. 8 and 9) of the contact pins, with a tab 86 being provided at the end of the respective upper and lower contact tails for maintaining alignment between the contact tails prior to soldering of the contact tails to the circuit boards 87 and 88 of the line replaceable module.

The ends of the front side of the upper and lower shell halves 56 and 57 include, respectively, keying features 89 and connector attachment screws 90, details of which may be found in copending U.S. patent application Ser. No. 08/782,792, filed Jan. 10, 1997, and which are arranged to cooperated with the corresponding holes 12 and openings 13 on frame 1 of the preferred backplane assembly. These features are standard and form no part of the present invention.

Both the electrical connector insert 52 and fiber optic connector insert 53 are surrounded by shields, respectively numbered as elements 69 and 70, which have a conventional configuration and are arranged to engage the walls of openings 8 and 11 in raised portion 14 of frame 1 of the backplane assembly of the preferred embodiment. While the shields 69 and 70 may be captured and secured between shell halves 56 and 57 by any of a variety of known arrangements, in the illustrated embodiment capture is achieved by means of flanges 71 on respective downwardly and upwardly extending portions 72–74 and 75–77 situated at the front of the upper and lower halves forwardly of tower portions 58–60 and 61–62. Flanges 71 cooperate with flanges 78 on the respective shields to capture the shields when the upper and lower halves are assembled together in a manner similar to that described in copending U.S. patent application Ser. No. 08/782,792, cited above, and illustrated in FIG. 13.

Turning to FIGS. 15–18, the fiber optic connector insert 53 of the illustrated line replaceable module connector for use with the preferred backplane assembly includes openings 91 for each of the plurality of dual fiber optic connector modules 54, with each module 54 including a pair of openings 92 for receiving the individual connectors 55. The connector modules each includes a front portion 93 for aligning the mating portions 94 of connectors 55 with corresponding mating portions of connectors 16 on the backplane assembly, and a rear pin block portion 95 which cooperates with pin block portions 96 of the individual connectors 55 and with surface 97 at the rear of the connector insert openings 91 to define the axial positions of the respective connectors and modules. The pin block portions 96 of the individual connectors are secured in the modules and biased forwardly by retention springs 98 which are fitted into openings 99 of caps 100.

Preferably, the retention springs 98 are in the form of a leaf arrangement made of four simple curved beam springs stacked in each opening 99. As was the case for the optical backplane assembly described in connection with FIGS. 5 and 6, stacking of the simple curved beam springs permits a greater force to be generated over a small range of displacement than is possible with a single spring, which has been found to create a large spring force in a very small volume without plastic deformation.

The ribbon cables 101 extending from the connectors via boots 101' exit the modules through end slots 102 in caps 100, caps 100 being secured to rear projections 103 of the fiber optic connector insert 53 by means of screw holes 104 in the projections 103, plates 105 containing openings 106, screws 107, and shoulders 107' on formed in the rear of caps 100. Finally, in the illustrated arrangement, the shield 70 for the fiber optic connector insert includes a separate front plate 108 secured to the insert by screws 109, slots 102 include a portion 102' extending around the side of the cap to facilitate assembly of the connectors into the inserts, and front portions 93 of the inserts include keyways 110 which cooperate with slots 111 in openings 91 in the fiber optic connector insert 53 to ensure proper orientation of the connector modules 54 with respect to the connector insert 53.

It will of course be appreciated that the details of the manner in which the electrical and fiber optic inserts are assembled and mounted in connector 50 can be freely varied without affecting the structure of the backplane assembly which constitutes the principle preferred embodiment of the invention. While aspects of the construction of connector 50 as described above may be particularly advantageous, it is intended that the invention not be limited by any of these details, which are included for illustrative purposes.

Thus, having described various preferred embodiments of the invention with sufficient particularity to enable those skilled in the art to make and use the invention, it should nevertheless be appreciated that variations and modifications of the preferred embodiment not specifically described herein may be made without departing from the scope of the invention. Instead, it is intended that the invention not be limited by the above description or accompanying drawings, but that it be defined solely in accordance with the appended claims.

I claim:

1. A backplane assembly, comprising:
   a frame having a plurality of first openings and a plurality of second openings;
   an electrical backplane including a plurality of electrical connector inserts arranged to fit through respective ones of said plurality of first openings, and means for attaching said electrical backplane to said frame;
   a fiber optic backplane including a plurality of individual connector openings for receiving individual fiber optic connectors, said fiber optic connectors being arranged in rows with at least one row of fiber optic connectors being received in said second openings of said frame, and means for attaching said fiber optic backplane to said frame,
   wherein said frame serves as a common datum for said electrical and fiber optic backplanes, and said electrical and fiber optic backplanes are separately removable from said frame.

2. An assembly as claimed in claim 1, wherein said fiber optic connectors all have the same orientation.

3. An assembly as claimed in claim 1, wherein said fiber optic connectors are MT connectors.

4. An assembly as claimed in claim 1, wherein said fiber optic backplane includes additional fiber optic connectors for faciliating fiber optic input/output connections to said rack.

5. An assembly as claimed in claim 1, wherein said electrical and fiber optic backplane attachment means are screws.

6. An assembly as claimed in claim 1, wherein said backplane assembly forms a backpanel of a line replaceable module rack system, and said electrical backplane is substantially smaller than said fiber optic backplane.

7. An assembly as claimed in claim 1, wherein said electrical and fiber optic backplanes are attached to a rear side of said frame, and a front side of said frame includes mating interface features for engaging corresponding mating interface features of mating connectors containing both optical and electrical connector components.

8. An assembly as claimed in claim 7, wherein said mating interface features include means for receiving attachment screws extending from said mating connectors.

9. An assembly as claimed in claim 7, wherein said mating interface features include means for receiving keying features extending from said mating connectors.

10. An assembly as claimed in claim 7, wherein said mating interface features include means for providing shield continuity between said electrical and optical backplanes and said mating connectors.

11. An assembly as claimed in claim 7, wherein said mating connectors are connectors attached to line replaceable modules of a component rack system.

12. An assembly as claimed in claim 1, wherein said fiber optic connectors are secured to said fiber optic backplane by retention plates, each retention plate serving to retain a pair of said connectors within said individual connector openings.

13. An assembly as claimed in claim 12, wherein said retention plates include cavities arranged to accommodate biasing means for biasing said connectors in a mating direction.

14. An assembly as claimed in claim 13, wherein said biasing means comprises a retaining plate having a stack of curved beam springs bonded thereto, said retaining plate being assembled over fiber optic cables extending from said connectors and being retained in said cavities by said retention plates.

15. An assembly as claimed in claim 14, wherein said connectors are line replaceable module connectors and also include means for biasing said fiber optic connectors in a mating direction, said means for biasing said fiber optic connectors of said line replaceable modules in said mating direction including springs comprising stacked curved beam springs.

* * * * *